Oct. 4, 1960 J. E. DAWKINS 2,955,271
MULTITURN CABLE CONNECTION
Filed July 10, 1958 2 Sheets-Sheet 1
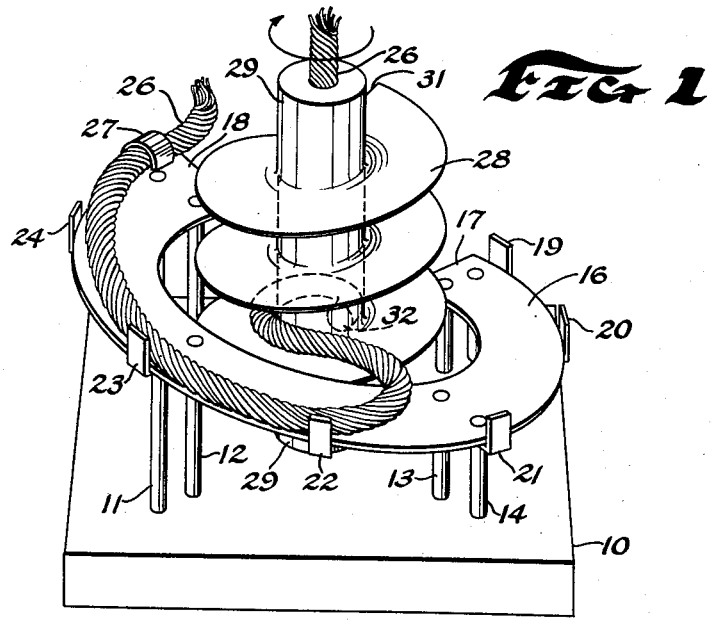
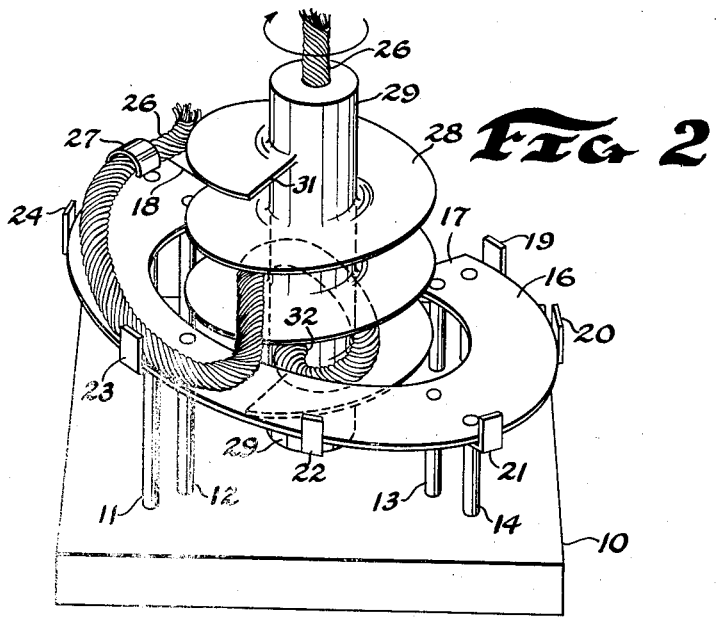
INVENTOR.
JOHN E. DAWKINS
BY
ATTORNEY

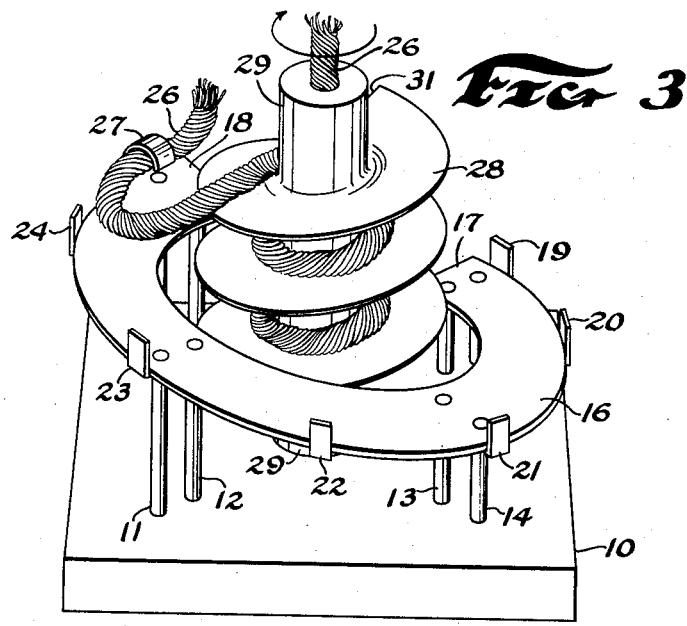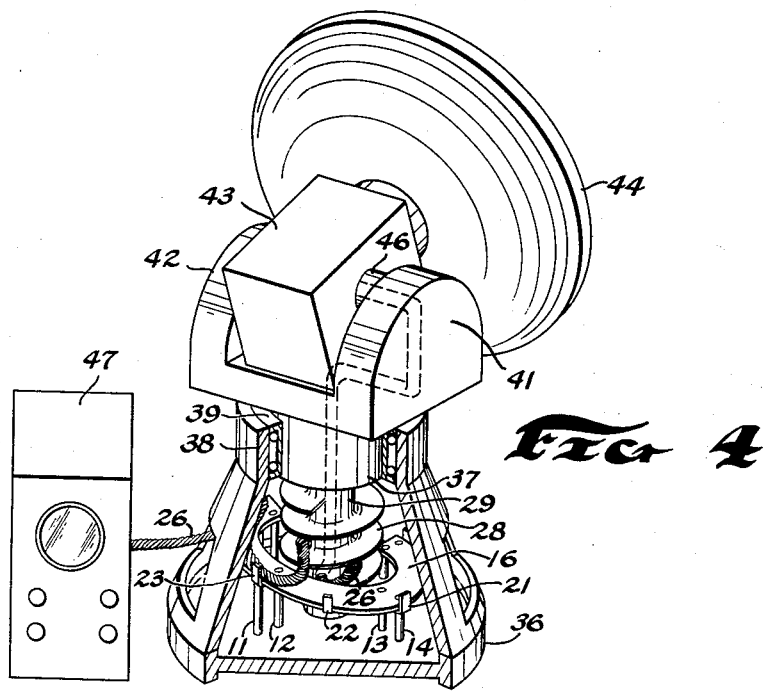

United States Patent Office 2,955,271
Patented Oct. 4, 1960

2,955,271

MULTITURN CABLE CONNECTION

John E. Dawkins, Hiawatha, Iowa, assignor to Collins Radio Company, Cedar Rapids, Iowa, a corporation of Iowa Filed July 10, 1958, Ser. No. 748,568

5 Claims. (Cl. 339—2)

This invention relates in general to a cable connection, and in particular to apparatus for making an electrical connection between a rotatable and stationary member.

It is often necessary to establish and maintain electrical connections between stationary and rotatable members. It has been quite common in the past to use slip rings and brushes to make such connections; however, slide contacts give rise to problems such as burning of the brushes and induce certain noise that does not exist where a solid conductor extends between the two bodies.

It is an object of the present invention, therefore, to provide a means for connecting a flexible cable between a shaft and a rotatable body such that no slide contact is required.

Another object of the invention is to provide an improved cable connection between a fixed and rotatable body.

A feature of this invention is found in the provision for a first crescent-shaped guide attached to a fixed body about a rotatable member and with a spiral-shaped member mounted to the rotatable member so as to allow a flexible cable to extend from the fixed to the rotatable member.

Further features, objects, and advantages of this invention will become apparent when the following description is read in conjunction with the drawings, in which Figure 1 is a perspective view of the cable connection of this invention with the rotatable member near one extreme of rotation;

Figure 2 is a perspective view of the invention with the rotatable member at an intermediate point of rotation;

Figure 3 is a perspective view showing the rotatable member near the second extreme of rotation; and Figure 4 illustrates the invention installed in a practical application.

Figure 1 illustrates a base plate 10 upon which are mounted a number of standoffs 11, 12, 13, and 14 which carry thereon a generally crescent-shaped member 16. The first end 17 of the crescent-shaped member 16 is substantially lower than the second end 18.

A plurality of extensions 19, 20, 21, 22, 23, and 24 are mounted to the crescent-shaped member along its outer edge.

A U-shaped bracket 27 engages a flexible multi-wire cable 26 adjacent the end 18 of the crescent-shaped member 16. A spiral member 28 is attached to a shaft 29 which is rotatably supported in the base member 10 and which extends upwardly through the crescent-shaped member 16. The flexible cable 26 extends into the shaft 29 through an opening 32 and up through the shaft as shown.

As best shown in Figure 4, the cable 26 could extend between a radiometric receiving apparatus 43 and an indicator 47. The radiometric apparatus 43 may be mounted on a suitable Y-shaped yoke comprising the arms 41 and 42 by means of a shaft 46. The yoke may have a collar 37 into which shaft 29 extends. The yoke collar 37 might be rotatably supported by suitable bearings 39 from a frame member 38 which has a suitable support means 36. An antenna 44 may be attached to the radiometric receiver 43. It might be desirable to rotate shaft 29 and yoke 37 through 720 degrees, for example. The present invention allows this to be done without any slide contacts.

It is to be realized that many electrical inputs may be necessary in a structure such as shown in Figure 4, and each electrical path is provided in the multi-wire cable 26 which carries various control, intelligence, and power signals.

Referring again to Figure 1, it is to be noted that a substantial portion of the cable 26 below the bracket 27 lies on the crescent-shaped member 16 and is prevented from extending beyond the crescent-shaped member 16 by the members 19–24. When the shaft 29 is in the extreme counterclockwise position substantially all of the cable 26 will lie on the crescent-shaped member 16 except for a short section which extends from the crescent directly to the opening 32. As the shaft 29 is rotated clockwise relative to Figure 1 the cable 26 will be wound about shaft 29 and supported by the spiral member 28. For example, Figure 1 illustrates the condition when the shaft 29 has been rotated approximately 345 degrees from the extreme counterclockwise position.

Figure 2 illustrates the condition when the shaft 29 has been rotated approximately 500 degrees.

Figure 3 illustrates the condition where the shaft 29 has been rotated approximately 800 degrees and has reached the clockwise limit rotation.

For satisfactory operating conditions it has been determined that if the cable diameter is designated as $D_1$ and the diameter of shaft 29 is designated as $D_2$ and the outside diameter of the spiral 16 is designated as $D_3$, the following relationships are satisfactory: $D_2$ should equal $3D_1$ and $D_3$ should equal $3D_2$. These relationships allow the cable to be taken up by the shaft 29 without subjecting it to acute bends or undue tension. As the shaft 29 rotates counterclockwise relative to the figures from the extreme clockwise position shown in Figure 3, cable 26 will unwind and lie along on the crescent-shaped member 16. In the extreme counterclockwise position substantially all of the cable 26 will lie on the crescent-shaped member 16.

This invention allows direct electrical connections to be made between a stationary and a rotatable member with no slide contacts. Although it has been described with respect to a preferred embodiment, it is not to be so limited, as changes and modifications may be made therein which are within the full intended scope of the invention as defined by the appended claims.

What is claimed is:

1. A multiturn cable connection between a rotatable and a stationary member comprising, a flexible cable, a crescent-shaped member with said flexible cable attached thereto adjacent one end thereof, a substantially vertical shaft rotatably mounted within the center of said crescent-shaped member, a spiral member attached to said rotatable shaft, said flexible cable extending into said rotatable shaft, and said spiral member serving as a guide for turns of said flexible cable as said rotatable shaft is turned.

2. A flexible cable connector for allowing multiturn rotation between a stationary and a fixed member, comprising a substantially horizontal base member, a plurality of standoffs of varying lengths perpendicularly attached to said base member, a crescent-shaped member attached to said standoffs, a substantially vertical shaft rotatably supported by said base member and extending up through the axis of said crescent-shaped member, a spiral member attached about said rotatable shaft, a flexible cable with one end attached adjacent the upper end of said crescent-shaped member and the other end extending within said rotatable shaft.

3. A flexible cable connector for allowing multiturn rotation between a stationary and a fixed member, comprising a substantially horizontal base member, a plurality of standoffs of varying lengths attached to said base member, a crescent-shaped member attached to said standoffs, a plurality of extensions formed about the outer portion of said crescent-shaped member to prevent the flexible cable from extending beyond it, a shaft rotatably supported by said base member and extending up through the center of said crescent-shaped member, a spiral member attached about said rotatable shaft, a flexible cable with one end attached adjacent the upper end of said crescent-shaped member, and the other end extending within said rotatable shaft.

4. A flexible cable connector for allowing multiturn rotation between a stationary and a fixed member, comprising a base member, a plurality of standoffs of varying lengths attached to said base member, a crescent-shaped member attached to said standoffs, such that one end is substantially lower than the other end, a shaft rotatably supported by said base member and extending substantially vertically through the axis of said crescent-shaped member, a spiral member attached about said rotatable shaft, a flexible cable with one end attached adjacent the upper end of said crescent-shaped member and the other end extending within said rotatable shaft.

5. A flexible cable connector for allowing multiturn rotation between a stationary and a fixed member, comprising a substantially horizontal base member, a plurality of standoffs of varying lengths attached to said base member, a crescent-shaped member attached to said standoffs, a shaft rotatably supported by said base member and extending up through the center of said crescent-shaped member, a spiral member attached about said rotatable shaft, a flexible cable with one end attached adjacent the upper end of said crescent-shaped member and the other end extending within said rotatable shaft and the diameter of the rotatable shaft being three times the diameter of the flexible cable and the outer diameter of the crescent-shaped member being three times the diameter of the shaft.

References Cited in the file of this patent

UNITED STATES PATENTS 2,340,630     Ungar _____ Feb. 1, 1944